(12) United States Patent  
Kitamura et al.

(10) Patent No.: US 7,420,312 B2
(45) Date of Patent: Sep. 2, 2008

(54) ROTATING ELECTRICAL MACHINE

(75) Inventors: Yutaka Kitamura, Tokyo (JP); Yoshihito Asao, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 385 days.

(21) Appl. No.: 11/342,667

(22) Filed: Jan. 31, 2006

(65) Prior Publication Data

US 2006/0186754 A1    Aug. 24, 2006

(30) Foreign Application Priority Data

Feb. 4, 2005    (JP)    ............................ P2005-029161

(51) Int. Cl.
H02K 1/22    (2006.01)
H02K 1/24    (2006.01)
H02K 1/27    (2006.01)

(52) U.S. Cl. ..................................... 310/263; 310/68 R
(58) Field of Classification Search ............... 310/68 R, 310/156.66–156.72, 263
See application file for complete search history.

(56) References Cited

U.S. PATENT DOCUMENTS 4,990,812 A * 2/1991 Nam ........................... 310/261
6,563,246 B1 * 5/2003 Kajiura et al. ............... 310/162
6,750,587 B2 * 6/2004 York et al. .................. 310/263
2006/0158053 A1 * 7/2006 Aschoff et al. ............... 310/91

FOREIGN PATENT DOCUMENTS

| FR | 2536603 A1 | * | 5/1984 |
| JP | 61244255 A | * | 10/1986 |
| JP | 2001275326 A | * | 10/2001 |
| JP | 2001314053 A | * | 11/2001 |
| JP | 2001359263 A | * | 12/2001 |

\* cited by examiner

*Primary Examiner*—Tran Nguyen
(74) *Attorney, Agent, or Firm*—Sughrue Mion, PLLC (57) ABSTRACT

Provided is a rotating electrical machine including an armature core on which an armature winding is wound; a rotor core which is supported by a rotation axis at a predetermined air gap in an inner diameter side of the armature core, and includes claw-shaped magnetic pole portions in which adjacent magnetic poles have different poles and a cylindrical portion having a field winding; and a permanent magnet which is provided in a magnetic circuit of the rotor core and supplies magnetic flux to the armature core with the field winding, wherein a magnetic short-circuiting mechanism for demagnetizing the magnetic flux of the permanent magnet by deforming a portion of the magnetic short-circuiting mechanism by a centrifugal force and short-circuiting between the magnetic pole portions of the rotor core is provided in the rotor core.

10 Claims, 11 Drawing Sheets

ROTATING ELECTRICAL MACHINE

BACKGROUND OF THE INVENTION

1. Field of the Invention

The present invention relates to a rotating electrical machine having a permanent magnet for supplying magnetic flux to an armature core in cooperation with a field winding in a rotor.

2. Description of the Related Art

For example, in a charging generator (alternator) for a vehicle, in order to increase an electrical load necessary for the vehicle or improve fuel consumption due to a light weight, a high output, a small size, and a light weight are required. In order to address such requirements, by adding a magnetizing force due to a permanent magnet to the magnetic field of the generator, leakage magnetic flux between magnetic poles is reduced and efficient magnetic flux increases to improve an output. However, in the generator having such a configuration, even if electrical generation is performed only by the magnetic flux of the permanent magnet without flowing field current, generated electrical energy exceeds the electrical load at the time of a small electrical load and high rotation and thus a battery may be damaged due to overcharging or an abnormal voltage may be applied to the electrical load to be damaged.

Japanese Patent 3063106 discloses a generator including a permanent magnetic and a field winding in a magnetic field, in which magnetic flux passing through an armature core, that is, linked to an armature coil, increases or decreases by changing a value of field current flowing in a field winding and a flow direction thereof such that an output voltage is adjusted to an adequate value to prevent an over-voltage from being generated.

However, in the technology disclosed in Japanese Patent 3063106, a rotor includes two kinds of rotors, that is, a first rotor including at least the field winding and a second rotor including the permanent magnet. Thus, the structure thereof is complicated and weight or cost increases. In addition, since a switching means for switching the flow direction of the field current is further included, the cost more increases.

Furthermore, when the rotor rotates at a high speed and an electrical load is small, in order to suppress the over-voltage from being generated, there is a problem that the current must continuously flow in the field winding in a direction for reducing the magnetic flux of the permanent magnet and thus power consumption increases.

SUMMARY OF THE INVENTION

An object of the present invention is to provide a rotating electrical machine having a small size, low cost, and an high output, in which efficient magnetic flux increases by magnetic flux due to a permanent magnet and magnetic flux due to a field winding to increase generated power in a low-speed rotation area and a magnetic short-circuiting body is deformed by a centrifugal force of a rotor core to short-circuit between the magnetic poles of the rotor core in a high-speed rotation area, such that the magnetic flux of the permanent magnet which causes difficulty for adjusting a voltage is reduced and an over-voltage is prevented from being generated.

A rotating electrical machine includes an armature core on which an armature winding is wound; a rotor core which is supported by a rotation axis at a predetermined air gap in an inner diameter side of the armature core, and includes claw-shaped magnetic pole portions in which adjacent magnetic poles have different poles and a cylindrical portion having a field winding; and a permanent magnet which is provided in a magnetic circuit of the rotor core and supplies magnetic flux to the armature core with the field winding, wherein the rotor core is provided with a magnetic short-circuiting mechanism for demagnetizing the magnetic flux of the permanent magnet by short-circuiting between the magnetic pole portions of the rotor core due to deforming a portion of the magnetic short-circuiting mechanism by a centrifugal force.

According to the invention, since the magnetic short-circuiting mechanism for deforming the magnetic short-circuiting body by a centrifugal force and short-circuiting between the magnetic pole portions of the rotor core is provided, it is possible to realize a rotating electrical machine having a small size, low cost, and a high output, which can obtain high output and high torque characteristics in an entire area including a low-speed area and a high-speed area.

BRIEF DESCRIPTION OF THE DRAWINGS

The invention will be described with reference to the accompanying drawings, wherein like numbers reference like elements, and wherein.

DESCRIPTION OF THE PREFERRED EMBODIMENTS

Hereinafter, embodiments according to the invention will be described with reference to the accompanying drawings.

First Embodiment

Figure 1:
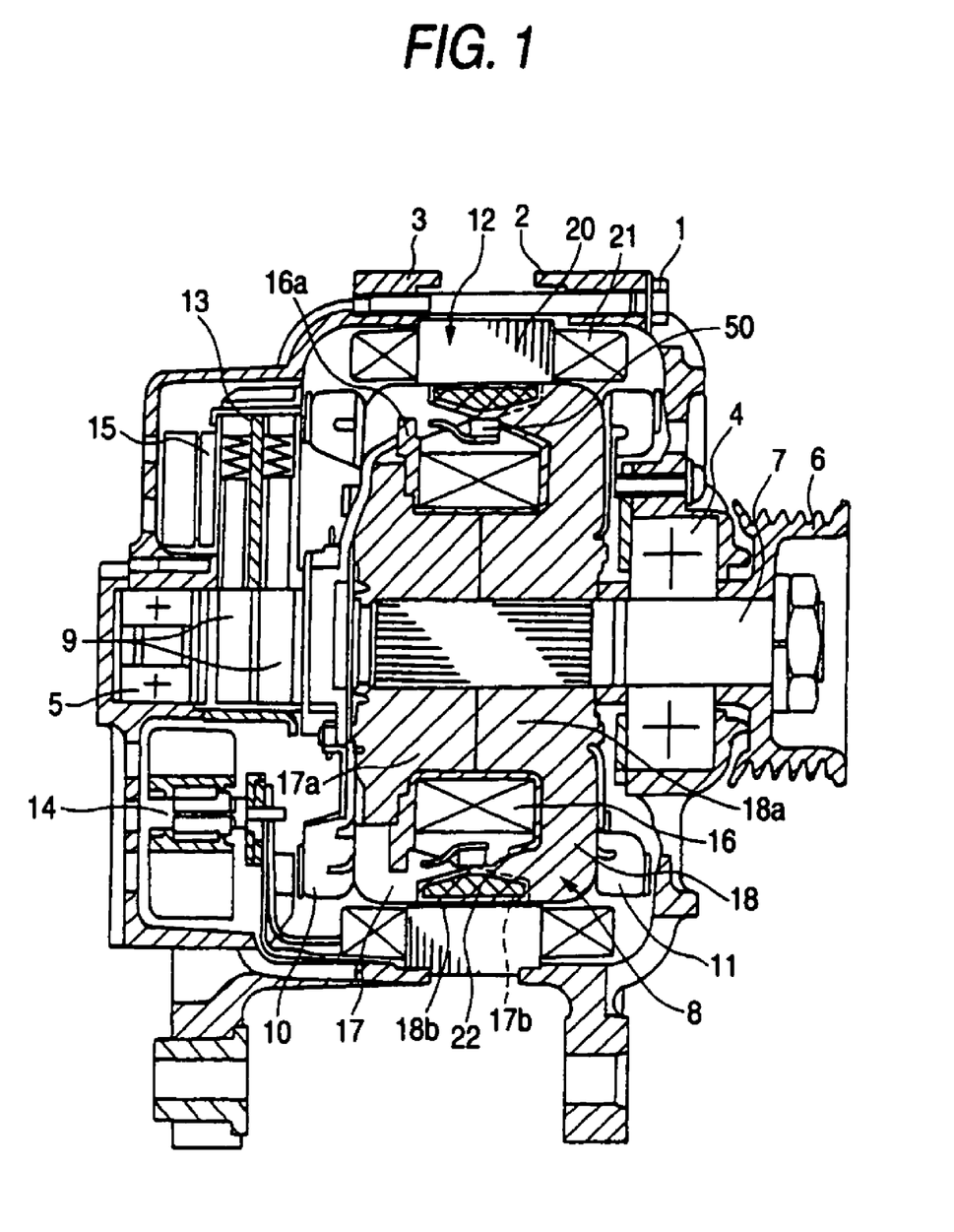
FIG. 1 is a longitudinal cross-sectional view illustrating a configuration of a charging generator according to a first embodiment of the invention.
Figure 2:
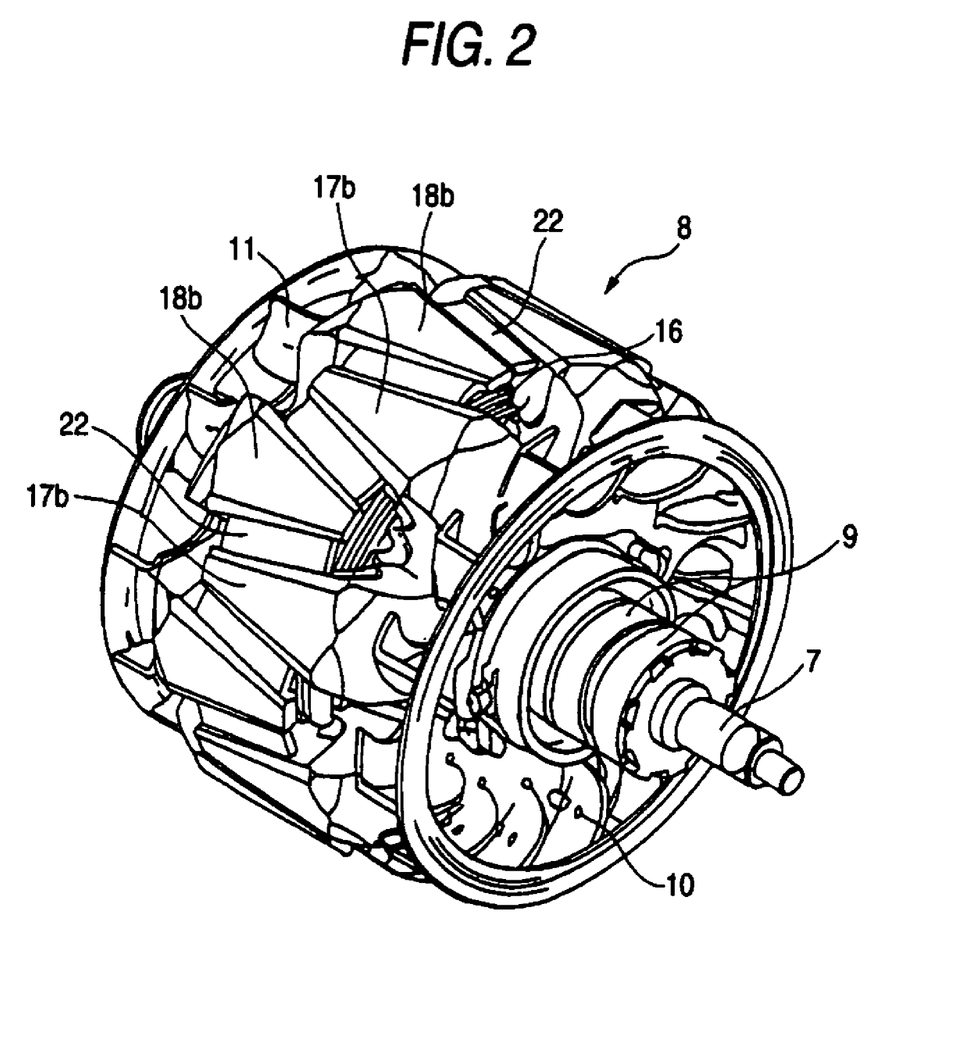
FIG. 2 is a perspective view illustrating a detailed configuration of a rotor shown in FIG. 1.

FIG. 1 is a longitudinal cross-sectional view illustrating a configuration of a charging generator according to a first embodiment of the invention, and FIG. 2 is a perspective view illustrating a detailed configuration of a rotor shown in FIG. 1.

As shown in FIG. 1, the charging generator includes a case composed of a front bracket 2 and a rear bracket 3 integrally formed by a bolt 1, a rotation axis 7 which is supported through bearings 4 and 5 in the case and whose one end is fixed with a pulley 6, a claw-shaped pole rotor 8 fixed to the rotation axis 7, a slip ring 9 fixed to the other end of the rotation axis 7 for supplying current to the rotor 8, cooling fans 10 and 11 fixed to the both sides of the rotor 8, an armature 12 fixed to the brackets 2 and 3, a brush holder 13 for receiving a pair of brushes which slides on the slip ring 9, a rectifying unit 14 electrically connected to the armature 12 for rectifying output current of the armature 12, a voltage control unit 15 fitted to the brush holder 13 for controlling the output voltage of the armature 12.

The rotor 8 includes a field winding 16 for flowing current to generate magnetic flux and a pair of rotor cores 17 and 18 which covers the field winding 16 and forms magnetic poles by the magnetic flux. The rotor cores 17 and 18 are composed of cylindrical portions 17a and 18a in which the field winding 16 is provided through a bobbin 16a and claw-shaped magnetic pole portions 17b and 18b. In addition, the magnetic pole portions 17b and 18b are formed by the same number as that of the poles and alternately cross to cover the outer diameter side of the field winding 16. The adjacent magnetic pole portions 17b and 18b are arranged in a constant pitch at a predetermined interval in a circumferential direction and are alternately magnetized to be different poles by the field winding 16. A permanent magnet 22 is inserted into the interval to reduce leakage magnetic flux between the magnetic pole portion 17b and the magnetic pole portion 18b.

A magnetic short-circuiting mechanism 50 according to the invention is arranged between the magnetic pole portions 17b and 18b of the rotor 8. The magnetic short-circuiting mechanism 50 is composed of a magnetic material as mentioned below, one end thereof is adhered and fixed to the inner circumferential surface of the magnetic pole portion 17b, and the other end thereof faces the inner circumferential surface of the magnetic pole portion 18b at a predetermined air gap.

The armature 12 is composed of an armature core 20 through which a rotation magnetic field due to the rotor 8 passes and an armature winding 21 in which a conducting wire is wound on the armature core 20 and the output current flows.

Figure 3A:
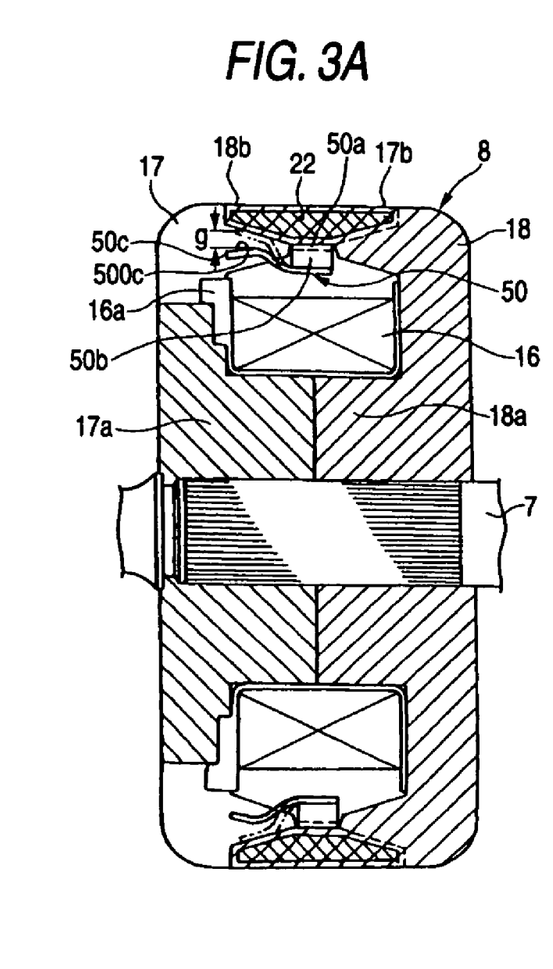
FIG. 3A is a cross-sectional view of main portions of the rotor shown in FIGS. 1 and 2.
Figure 3B:
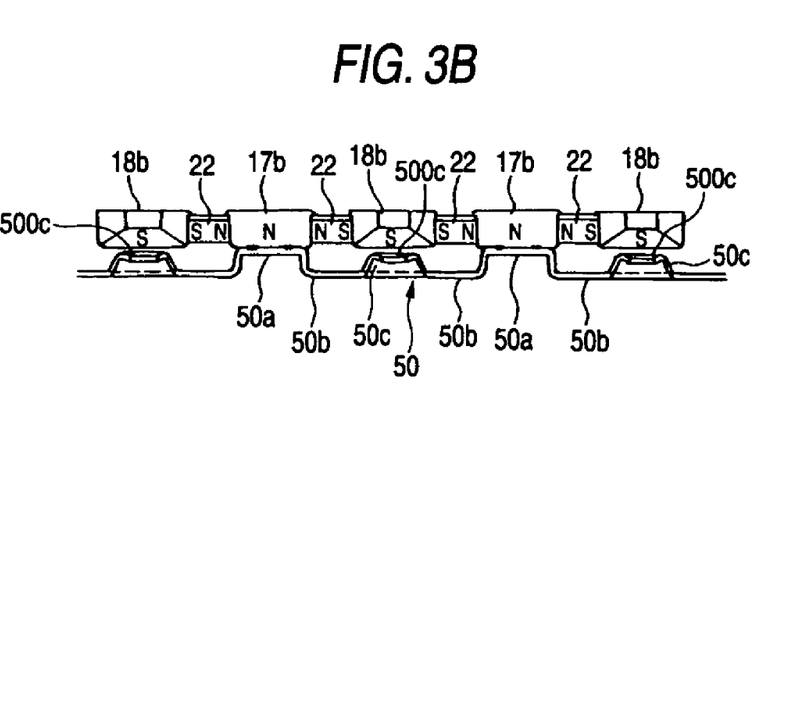
FIG. 3B is a view of linearly developing a shape viewed from the side of a rotor core in order to explain configuration states of magnetic pole portions, a permanent magnet, and a magnetic short-circuiting mechanism of the rotor shown in FIGS. 1 and 2.

FIG. 3A is a cross-sectional view of main portions of the rotor 8 of the charging generator shown in FIGS. 1 and 2, and FIG. 3B is a linearly developed view of a shape viewed from the side of the rotor core 17 in order to enhance understanding of a correlation in the configuration among the magnetic pole portions 17b and 18b, the permanent magnet 22, and the magnetic short-circuiting mechanism 50 of the rotor 8.

As shown in FIG. 3B, in the magnetic short-circuiting mechanism 50, a fixing portion 50a, a connecting portion 50b, and an elastic deformation portion 50c configure a magnetic short-circuiting body unit, and the magnetic short-circuiting body units are connected in succession. The fixing portion 50a is fixed to the inner circumferential surface of the magnetic pole portion 17b, for example, by laser welding, and the elastic deformation portion 50c is formed through the connecting portion 50b such that the outer circumferential surface 500c thereof faces the inner circumferential surface of the magnetic pole portion 18b at a predetermined air gap g.

Next, an operation of a rotation electrical machine according to the first embodiment of the invention having the above-mentioned configuration will be described. When an external force such as centrifugal force is not applied, the elastic deformation portion 50c of the magnetic short-circuiting mechanism 50 is positioned apart from the inner circumferential surface of the magnetic pole portion 18b by the predetermined air gap g, as indicated by a solid line of FIG. 3A, and is held in a state of a large magnetic resistance with the magnetic pole portion 18b. Thus, the leakage of the magnetic flux between the magnetic pole portion 17b and the magnetic pole portion 18b is low.

Next, when the rotor 8 begins to rotate and the rotation thereof rises to increase the applied centrifugal force, the elastic deformation portion 50c is elastically deformed toward the inner circumferential surface of the magnetic pole portion 18b and comes into contact with the inner circumferential surface of the magnetic pole portion 18b by high-speed rotation of at least a first predetermined rotation speed N1, as indicated by alternate long and short dashed lines of FIG. 3A. Thus, the magnetic pole portion 17b and the magnetic pole portion 18b are in a short-circuiting state by a magnetic circuit including the fixing portion 50a, the connecting portion 50b, and the elastic deformation portion 50c of the magnetic short-circuiting mechanism 50.

Since the magnetic flux due to the magnetizing force of the permanent magnet 22 passes through the magnetic circuit having a small magnetic resistance in the order of the magnetic pole portion 17b, the magnetic short-circuiting mechanism 50, the magnetic pole portion 18b, and the permanent magnet 22, the magnetic flux passing through the armature core 20 by the magnetizing force of the permanent magnet 22 is reduced. When the rotation speed is then reduced, the centrifugal force is reduced. Further, when the rotation speed falls below a second predetermined rotation speed N2, the elastic deformation portion 50c returns to the original position spaced apart from the inner circumferential surface of the magnetic pole portion 18b by the predetermined air gap, due to the elastic force of the elastic deformation portion 50c and the twist elastic force of the connecting portion 50b.

As mentioned above, according to the first embodiment of the invention, even if the permanent magnet 22 having a large magnetizing force is mounted, the magnetic short-circuiting mechanism 50 operates at the time of the high-speed rotation to short-circuit the magnetic pole portions 17b and 18b and to reduce the magnetic flux passing through the armature core 20 by the magnetizing force of the permanent magnet 22, thereby preventing an over-voltage which was a problem in the related art from being generated at the time of the light-load and high-speed rotation. Accordingly, since the permanent magnet 22 having the large magnetizing force can be mounted without generating the over-voltage, at the time of low-speed rotation in which the magnetic short-circuiting mechanism 50 does not operate, the efficient magnetic flux in which the magnetic flux due to the magnetizing force of the permanent magnet 22 passes through the armature core 20 increases and thus the output power can significantly increase.

Figure 4:
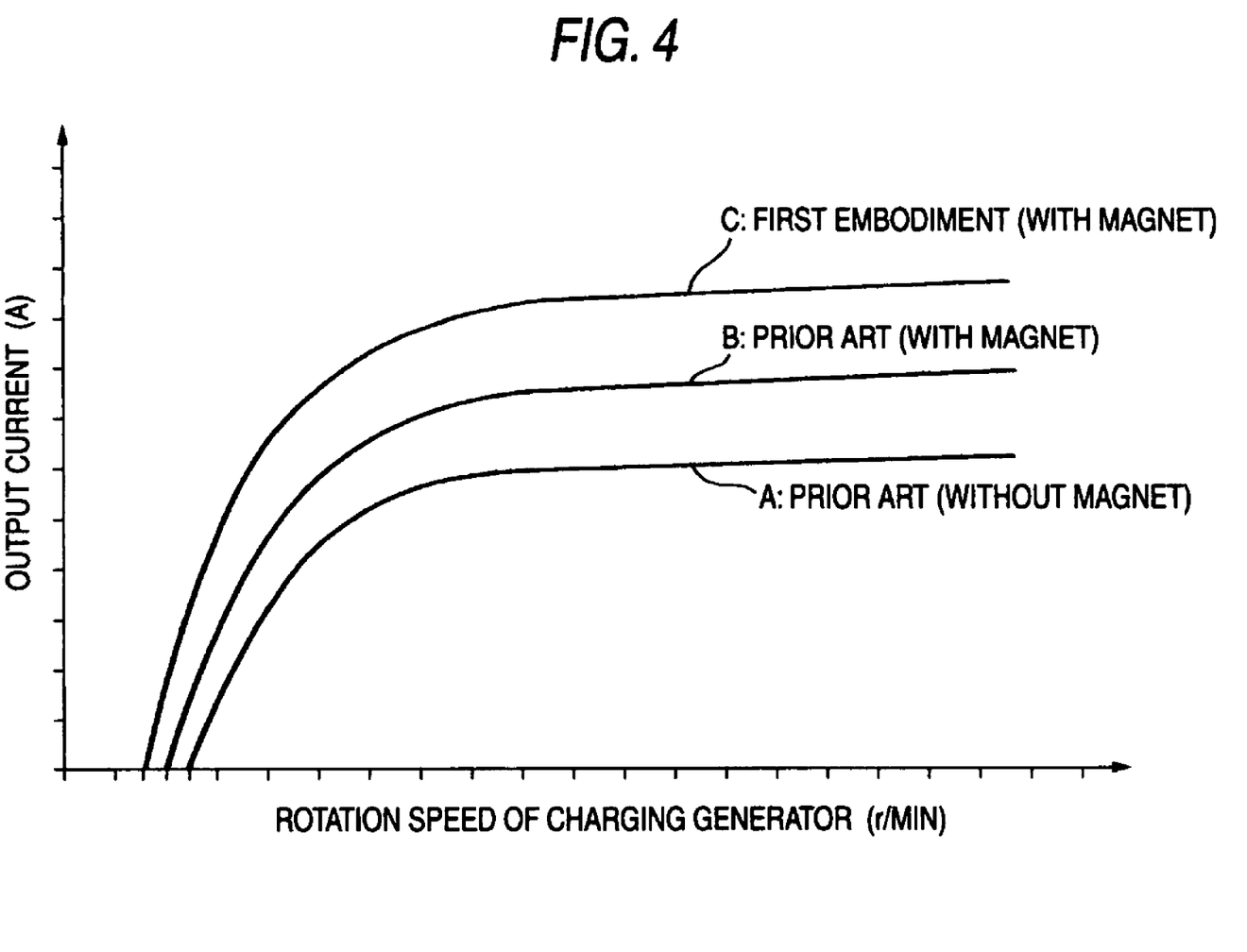
FIG. 4 is a view illustrating comparison of power generation output characteristics of the charging generator according to the first embodiment of the invention and a charging generator in related art.

FIG. 4 is a view illustrating comparison of power generation output characteristics of the charging generator according to the first embodiment of the invention and a charging generator in related art. In Figure, a horizontal axis denotes a rotation speed [r/min] of the charging generator and a vertical axis denotes output current [A]. In addition, a curve A denotes a related art apparatus without a permanent magnet, a curve B denotes a related art apparatus with a permanent magnet, and a curve C denotes the first embodiment of the invention. As shown in FIG. 4, the charging generator according to the first embodiment of the invention generates a largest power generation output in both the low-speed rotation and the high-speed rotation.

According to the invention, in comparison with the related arts, a field winding for reverse excitation or a switching means for switching a direction of the field current need not be provided, and thus the field winding and an attachment unit thereof can be easily designed and the manufacturing cost thereof can be reduced. In addition, since the magnetic short-circuiting mechanism is provided in the rotor and the magnetic field of the permanent magnet is demagnetized using a centrifugal force, the magnetic short-circuiting mechanism can operate in relation to the rotation speed of the rotor and thus the over-voltage can be efficiently prevented from being generated at the high speed.

Second Embodiment

Figure 5A:
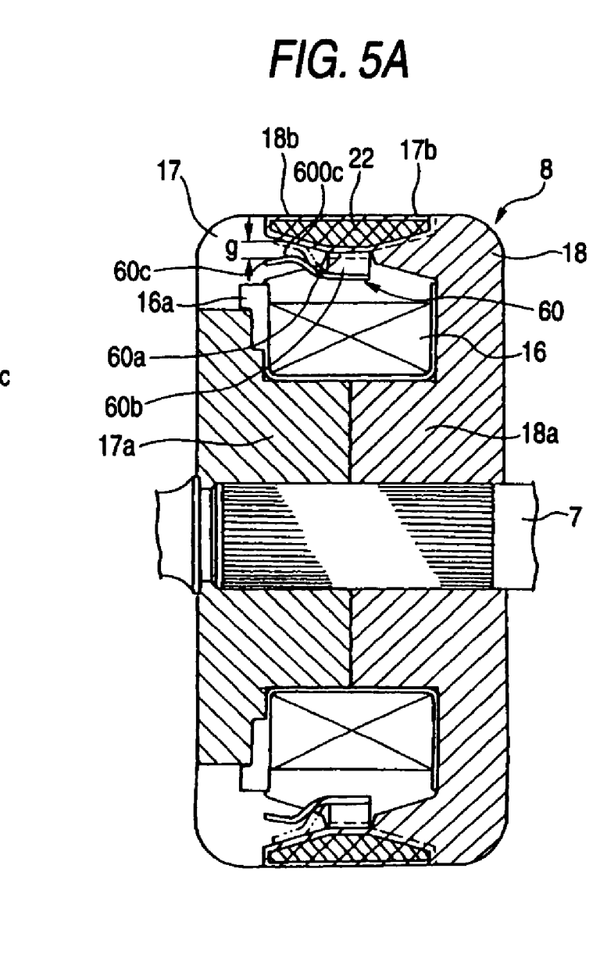
FIG. 5A is a cross-sectional view of main portions of a rotor of a charging generator according to a second embodiment of the invention.
Figure 5B:
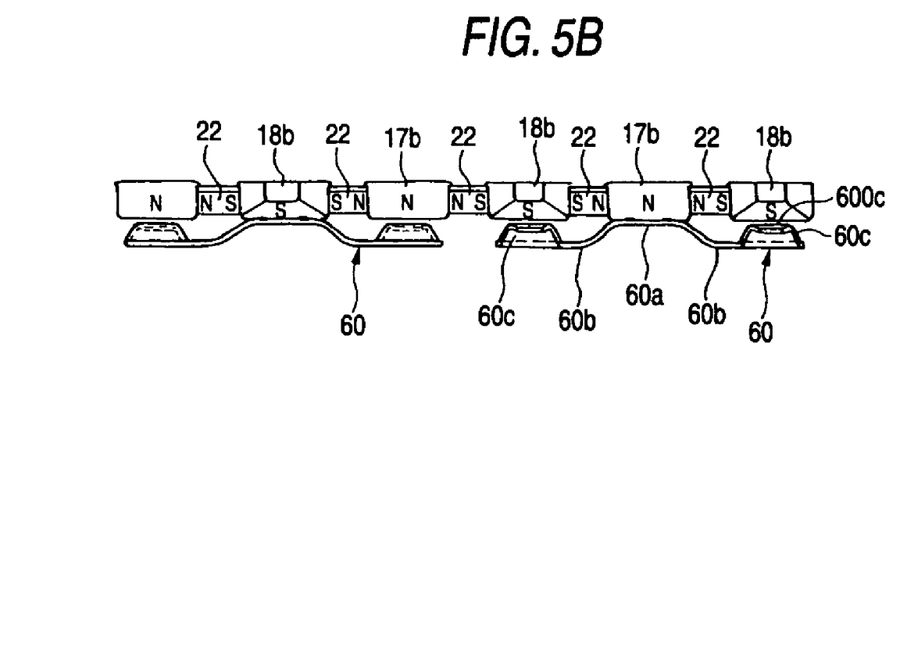
FIG. 5B is a view of linearly developing a shape viewed from the side of a rotor core in order to explain configuration states of magnetic pole portions, a permanent magnet, and a magnetic short-circuiting mechanism of the rotor in the charging generator according to the second embodiment of the invention.

FIG. 5A is a cross-sectional view of main portions of a rotor 8 of a charging generator according to a second embodiment of the invention, and FIG. 5B is a linearly developed view of a shape viewed from the side of a rotor core 17 in order to enhance understanding of the configuration among magnetic pole portions 17b and 18b, a permanent magnet 22, and a magnetic short-circuiting mechanism 60 of the rotor 8. Here, the same portions as those of the first embodiment shown in FIGS. 1, 2, and 3 are denoted by like reference numerals.

As shown in FIG. 5B, in the magnetic short-circuiting mechanism 60 according to the second embodiment of the invention, a fixing portion 60a and an elastic deformation portion 60c which symmetrically extends from the fixing portion 60a through connecting portions 60b in the both sides configure a magnetic short-circuiting body unit, and the magnetic short-circuiting body units are sequentially disposed in succession. The fixing portion 60a is fixed to the inner circumferential surface of the magnetic pole portion 17b (or 18b), for example, by laser welding, and the elastic deformation portion 60c is formed through the connecting portion 60b such that the outer circumferential surface 600c thereof faces the inner circumferential surface of the magnetic pole portion 18b (or 17b) at a predetermined air gap g.

An operation of the rotating electrical machine according to the second embodiment of the invention will be described. When an external force such as centrifugal force is not applied, the elastic deformation portion 60c of the magnetic short-circuiting mechanism 60 is positioned apart from the inner circumferential surface of the magnetic pole portion 17b or 18b by the predetermined air gap g, as indicated by a solid line of FIG. 5A, and is held in a state of a large magnetic resistance with the magnetic pole portion 17b or 18b. Thus, the leakage of the magnetic flux between the magnetic pole portion 17b and the magnetic pole portion 18b is low.

Next, when the rotor 8 begins to rotate and the rotation thereof rises to increase the size of the applied centrifugal force, the elastic deformation portion 60c is elastically deformed toward the inner circumferential surface of the magnetic pole portion 17b or 18b and the outer circumferential surface 600c comes into contact with the inner circumferential surface of the magnetic pole portion 17b or 18b by high-speed rotation of at least a first predetermined rotation speed N1, as indicated by a one-dotted chain line of FIG. 5A. Thus, the magnetic pole portion 17b and the magnetic pole portion 18b are in a short-circuiting state by a magnetic circuit including the fixing portion 60a, the connecting portion 60b, and the elastic deformation portion 60c of the magnetic short-circuiting mechanism 60.

Since the magnetic flux due to the magnetizing force of the permanent magnet 22 passes through the magnetic circuit having a small magnetic resistance in the order of the magnetic pole portion 17b, the magnetic short-circuiting mechanism 60, the magnetic pole portion 18b, and the permanent magnet 22, the magnetic flux passing through the armature core 20 by the magnetizing force of the permanent magnet 22 is reduced. When the rotation speed is then reduced, the centrifugal force is reduced. Further, when the rotation speed falls below a second predetermined rotation speed N2, the elastic deformation portion 60c returns to the position spaced apart from the inner circumferential surface of the magnetic pole portion 18b by the predetermined air gap, due to the elastic force of the elastic deformation portion 60c and the twist elastic force of the connecting portion 60b.

As mentioned above, according to the second embodiment of the invention, similar to the first embodiment, an over-voltage can be suppressed from being generated at the time of the light-load and high-speed rotation using the deformation due to the centrifugal force of the elastic deformation portion 60c of the magnetic short-circuiting mechanism 60 and thus the high output can be obtained at the time of low-speed rotation such as starting-up. In addition, according to the second embodiment, in the magnetic short-circuiting mechanism 60, since the fixing portion 60a and the elastic deformation portion 60c which symmetrically from the fixing portion 60a through the connecting portions 60b in the both sides configure the magnetic short-circuiting body unit and the magnetic short-circuiting body units are sequentially disposed in succession, it is possible to more reduce the number of the fixing portions, compared with the first embodiment which requires the fixing portion every other magnetic portion. Thus, it is possible to reduce the number of processes such as welding, etc. and to reduce assembling cost.

Third Embodiment

Figure 6A:
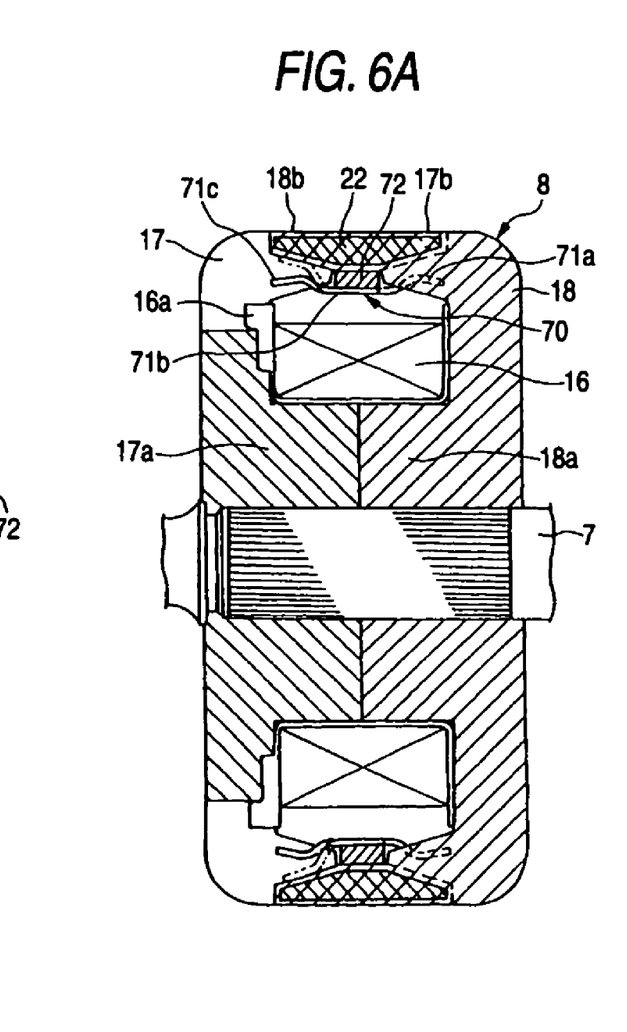
FIG. 6A is a cross-sectional view of main portions of a rotor of a charging generator according to a third embodiment of the invention.
Figure 6B:
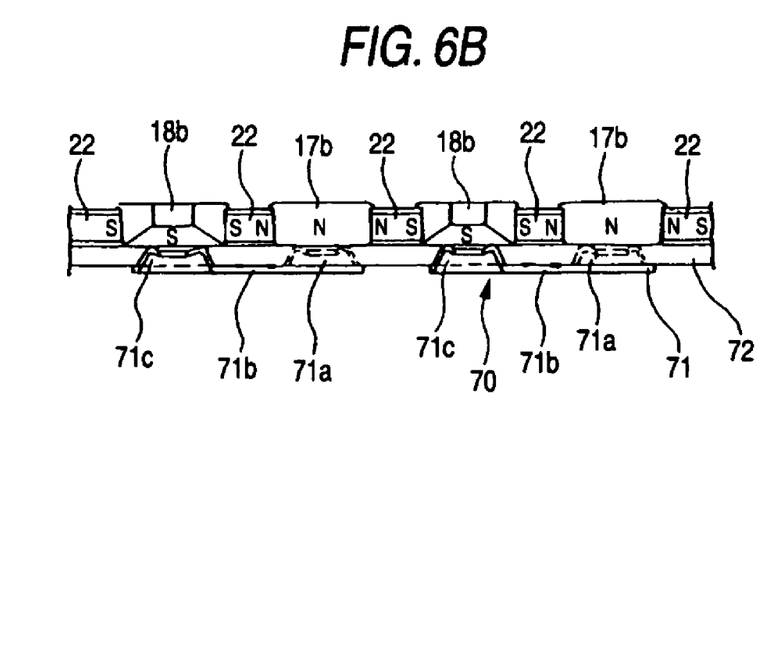
FIG. 6B is a view of linearly developing a shape viewed from the side of a rotor core in order to explain configuration states of magnetic pole portions, a permanent magnet, and a magnetic short-circuiting mechanism of the rotor in the charging generator according to the third embodiment of the invention.

FIG. 6A is a cross-sectional view of main portions of a rotor 8 a charging generator according to a third embodiment of the invention, and FIG. 6B is a view of linearly developing a shape viewed from the side of a rotor core 17 in order to easily understand configuration states of magnetic pole portion 17b and 18b, a permanent magnet 22, and a magnetic short-circuiting mechanism 70 of the rotor 8. Here, the same portions as those of the first embodiment shown in FIGS. 1, 2, and 3 are denoted by like reference numerals. As shown in FIG. 6B, the magnetic short-circuiting mechanism 70 according to the third embodiment of the invention includes a magnetic short-circuiting body unit 71 having an elastic deformation portion 71a, a connecting portion 71b, and an elastic deformation portion 71c, and a ring-shaped non-magnetic ring 72 made of a non-magnetic material. A plurality of magnetic short-circuiting body units 71 are sequentially fixed to the non-magnetic ring 72, for example, by laser welding, and the non-magnetic ring 72 is engaged to the magnetic pole portions 17b and 18b. Thus, the elastic deformation portions 71a and 71c face the inner circumferential surfaces of the magnetic pole portions 17b and 18b at a predetermined air gap, respectively.

An operation of the rotating electrical machine according to the third embodiment of the invention having the above-mentioned configuration is the same as those of the first and second embodiments and thus the detailed description will be omitted. According to the third embodiment, since the magnetic short-circuiting body unit 71 is previously fixed to the non-magnetic ring 72 in succession as a sub assembly and the non-magnetic ring 72 is engaged and attached to the magnetic pole portions 17b and 18b, the magnetic short-circuiting mechanism can be more easily attached, compared with the first and second embodiments in which the fixing portions 50a and 60a of the magnetic short-circuiting mechanisms are fixed to the magnetic pole portions 17b by the welding, respectively. Thus, the process time shortens and assembling cost is more reduced.

Fourth Embodiment

Figure 7A:
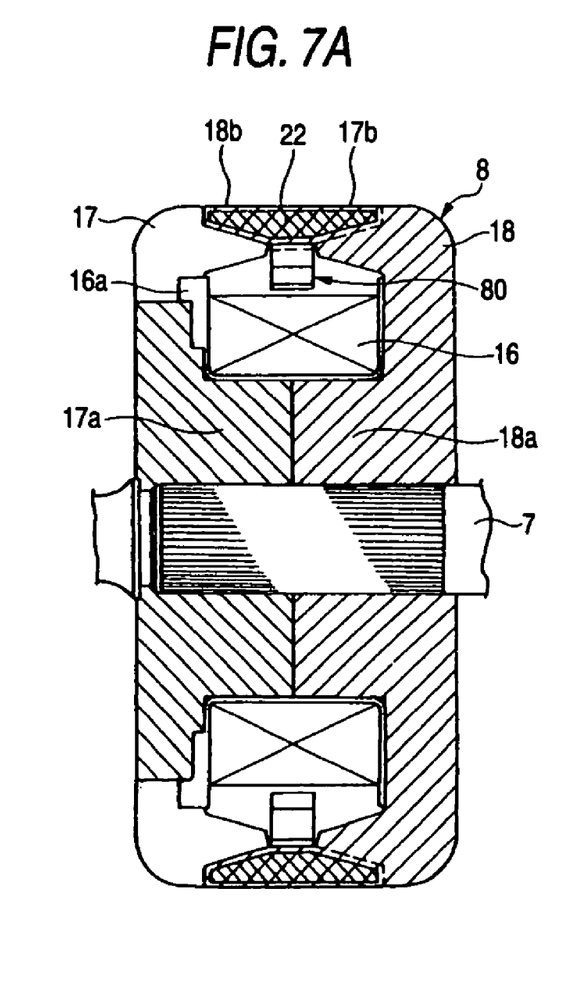
FIG. 7A is a cross-sectional view of main portions of a rotor of a charging generator according to a fourth embodiment of the invention.
Figure 7B:
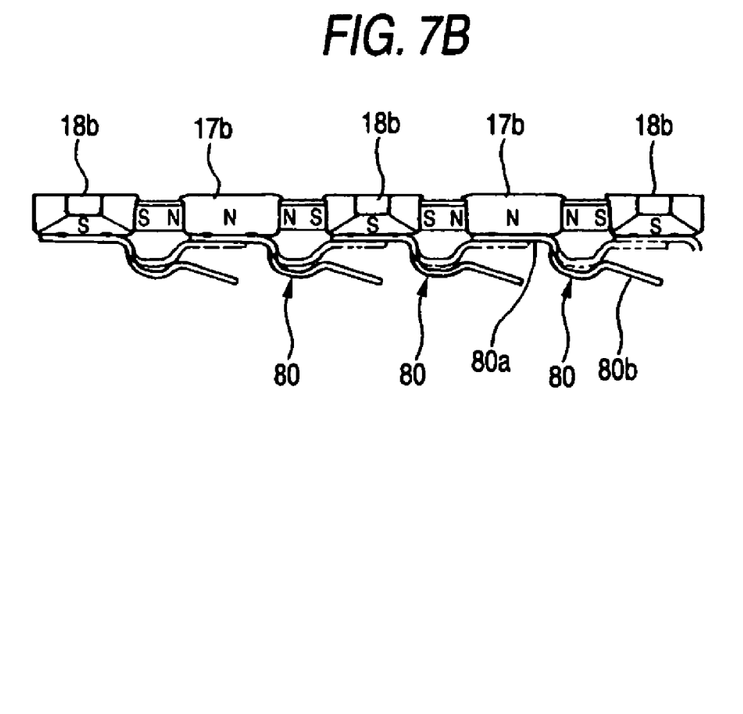
FIG. 7B is a view of linearly developing a shape viewed from the side of a rotor core in order to explain configuration states of magnetic pole portions, a permanent magnet, and a magnetic short-circuiting mechanism of the rotor in the charging generator according to the fourth embodiment of the invention.

FIG. 7A is a cross-sectional view of main portions of a rotor 8 of a charging generator according to a fourth embodiment of the invention, and FIG. 7B is a view of linearly developing a shape viewed from the side of a rotor core 17 in order to easily understand configuration states of magnetic pole portions 17b and 18b, a permanent magnet 22, and a magnetic short-circuiting mechanism 80 of a rotor 8. Here, the same portions as those of the first embodiment shown in FIGS. 1, 2, and 3 are denoted by like reference numerals.

As shown in FIG. 7B, in the magnetic short-circuiting mechanism 80 according to the fourth embodiment, a fixing portion 80a and an elastic deformation portion 80b configure a magnetic short-circuiting body unit, and the magnetic short-circuiting body units are disposed in succession. One end 80a of the magnetic short-circuiting body unit 80 is adhered to the magnetic pole portions 17b or 18b of one rotor core, the other end of the magnetic short-circuiting body unit 80 faces the inner circumferential surface of the magnetic pole portion 18b or 17b of the other rotor core at a predetermined air gap, and the other end of the magnetic short-circuiting body unit 80 comes into contact with the inner circumferential surface of the magnetic pole portion of the other rotor core by the rotation and rise of the rotor 8 and then goes away therefrom by the rotation reduction of the rotor.

The fixing portion 80a is fixed to the inner circumferential surface of the magnetic pole portion 17b (or 18b), for example, by laser welding, and the elastic deformation portion 80b faces the inner circumferential surface of the magnetic pole portion 18b (or 17b) at a predetermined air gap.

According to the fourth embodiment of the invention having the above-mentioned configuration, since the magnetic short-circuiting mechanism 80 is fixed to one rotor core, the attachment thereof is facilitated and thus workability and assembly performance are excellent.

The first to fourth embodiments are to explain exemplary embodiments of the invention and include all the modifications which the magnetic flux due to a permanent magnet is demagnetized by short-circuiting magnetic pole portions of a rotor core by a magnetic short-circuiting body driven by a centrifugal force. In addition, although the invention applies to the charging generator (alternator) in the first to fourth embodiments, the invention is not limited to these embodiments and may be applied to a motor generator including a charging generator and a starter generator. In this case, the output characteristics at the time of the operation of the generator and the torque characteristics at the time of the operation of the generator are more significantly improved from a low-speed area to a high-speed area, compared with the related art.

Fifth Embodiment

Figure 8:
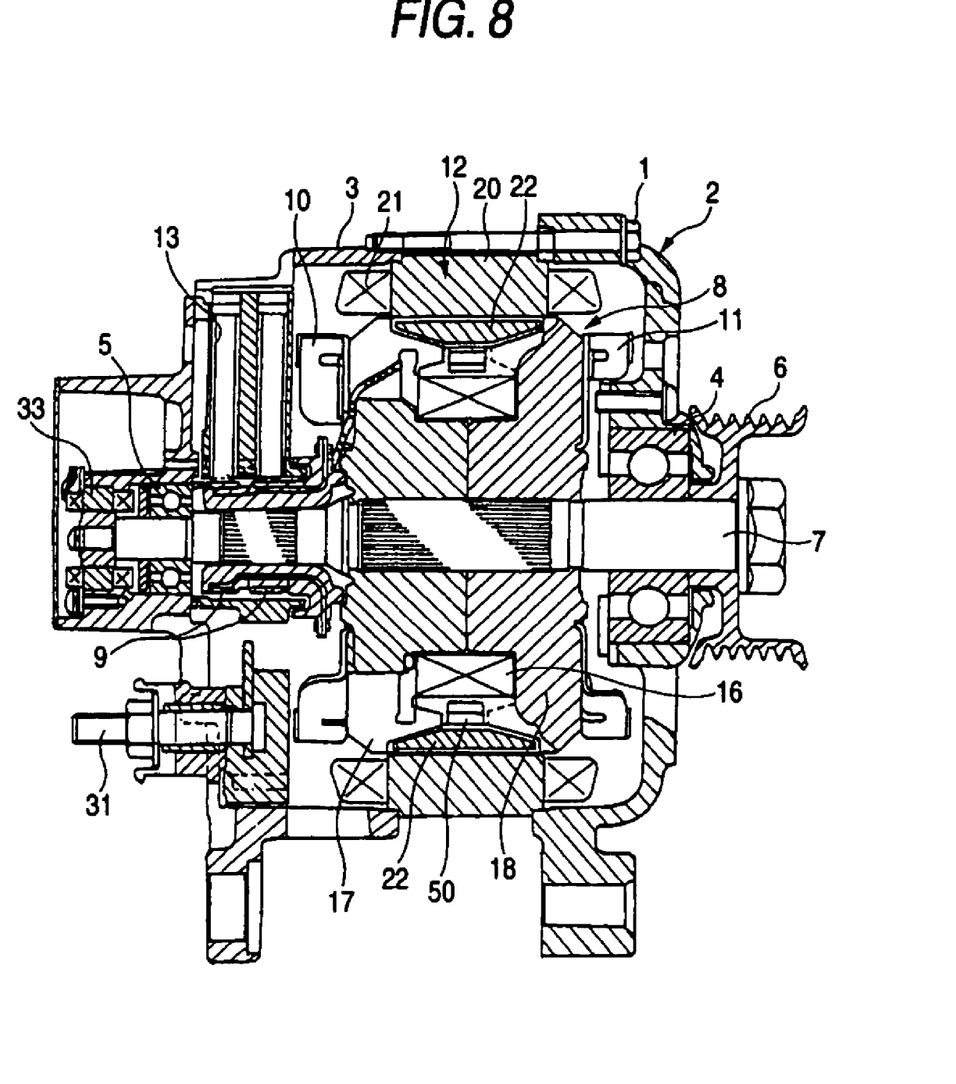
FIG. 8 is a longitudinal cross-sectional view illustrating a configuration of a rotating electrical machine including a charging generator and a starter generator according to a fifth embodiment of the invention.

FIG. 8 is a cross-sectional view illustrating a configuration of a rotating electrical machine including a charging generator and a starter generator according to a fifth embodiment of the invention. In FIG. 8, the rotating electrical machine including the charging generator and the starter generator is similar to the charging generator of the first embodiment in the configuration including a magnetic short-circuiting mechanism 50, except that a rotation position detector 33 for detecting rotation position of a rotor 8 and a three-phase terminal 31 connected to an armature winding 21 are included as special components.

Figure 9:
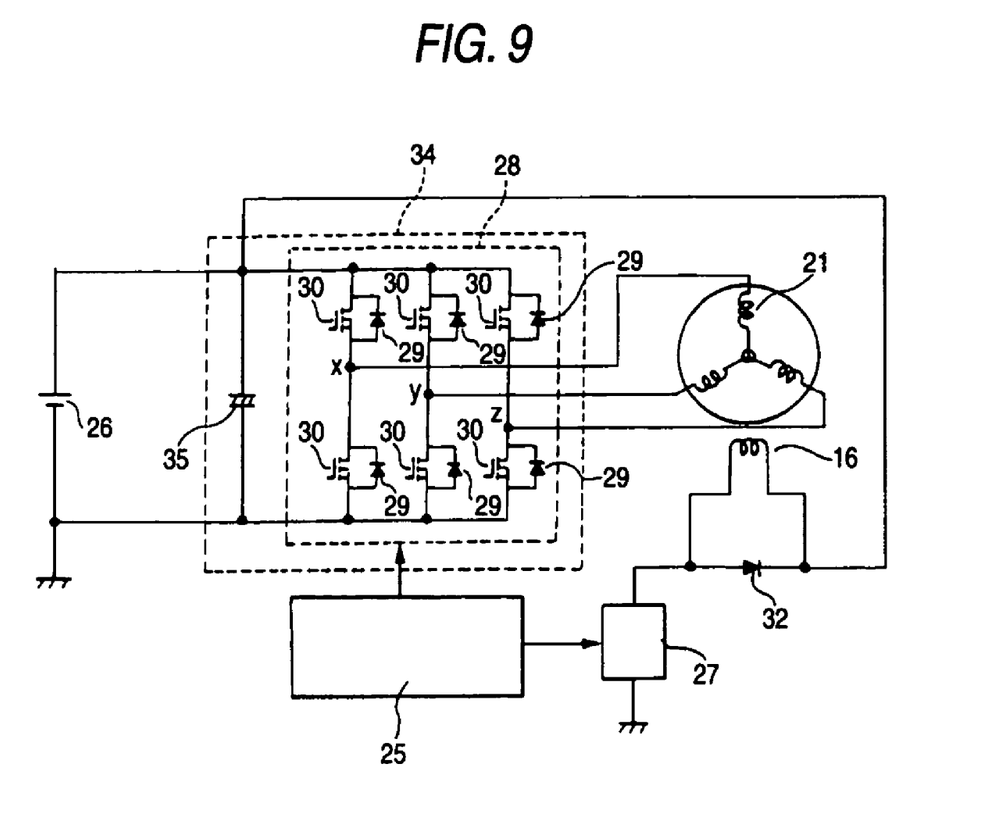
FIG. 9 is a circuit diagram illustrating a system including main portions of the rotating electrical machine including the charging generator and the starter generator shown in FIG. 8.

FIG. 9 is a circuit diagram illustrating a system including main portions of the rotating electrical machine including the charging generator and the starter generator shown in FIG. 8. In FIG. 9, this system includes a control unit 25 which is a voltage control means for controlling an output voltage of an armature winding 21, an ECU (engine control unit) (not shown) for inputting necessary information to the control unit 25, a field current control unit 27 for controlling field current in accordance with an instruction of the control unit 25, an inverter module 28 for rectifying output current of the armature winding 21, and a battery 26 charged by a voltage supplied through the inverter module 28. The control unit 25 controls the field current control unit 27 to control the size of the field current flowing in a field winding 16. In the inverter module 28, a set of a switching element 30 and a diode 29 coupled in parallel are connected in two sets in series, and the two sets of switching elements 30 and diodes 29 connected in series are connected in three sets in parallel. The ends of Y-connection (star connection) of the armature winding 21 are connected to intermediate connection points x, y, and z of the switching element 30 connected in series through an alternating current wire, respectively, and the switching operations of the switching elements 30 are controlled by the control unit 25.

An operation of the rotating electrical machine according to the fifth embodiment of the invention having the above-mentioned configuration will be described. The rotating electrical machine has the both functions of the charging generator and the starter generator and is, for example, used in an idling stop of a hybrid vehicle. Here, the operation of the rotating electrical machine will be described through the operation in the idling stop.

First, when a condition for starting up the idling stop is satisfied, an engine (now shown) stops, and, when a condition for starting up the engine again is satisfied, direct current power is supplied from the battery 26 to the inverter module 28. Accordingly, the control unit 25 controls the ON/OFF states of the switching elements 30 of the inverter module 28, the direct current power is transformed into three-phase alternating current power, and three-phase alternating current power is supplied to the armature winding 21 of the armature 12 through an alternating current wire.

Accordingly, a rotation magnetic filed is applied to the periphery of the field winding 16 of the rotor 8 supplied with the filed current by the field current control unit 27 and then the rotor 8 rotates. In addition, the rotation power of the rotor 8 is delivered from a pulley 6 to the engine through a power delivering unit (not shown) to start up the engine.

When the engine is started up, the rotation power of the engine is reversely delivered to the rotor 8 through the power delivering unit. Thus, the rotor 8 rotates and a three-phase alternating current voltage is induced in the armature winding 21. Accordingly, the control unit 25 controls the ON/OFF states of the switching elements 30 and the three-phase alternating current power induced in the armature winding 21 is transformed into direct current power to charge the battery 26. The control operation, the function, and the effect of the charging generator thereafter are similar to those of the first embodiment.

Figure 10:
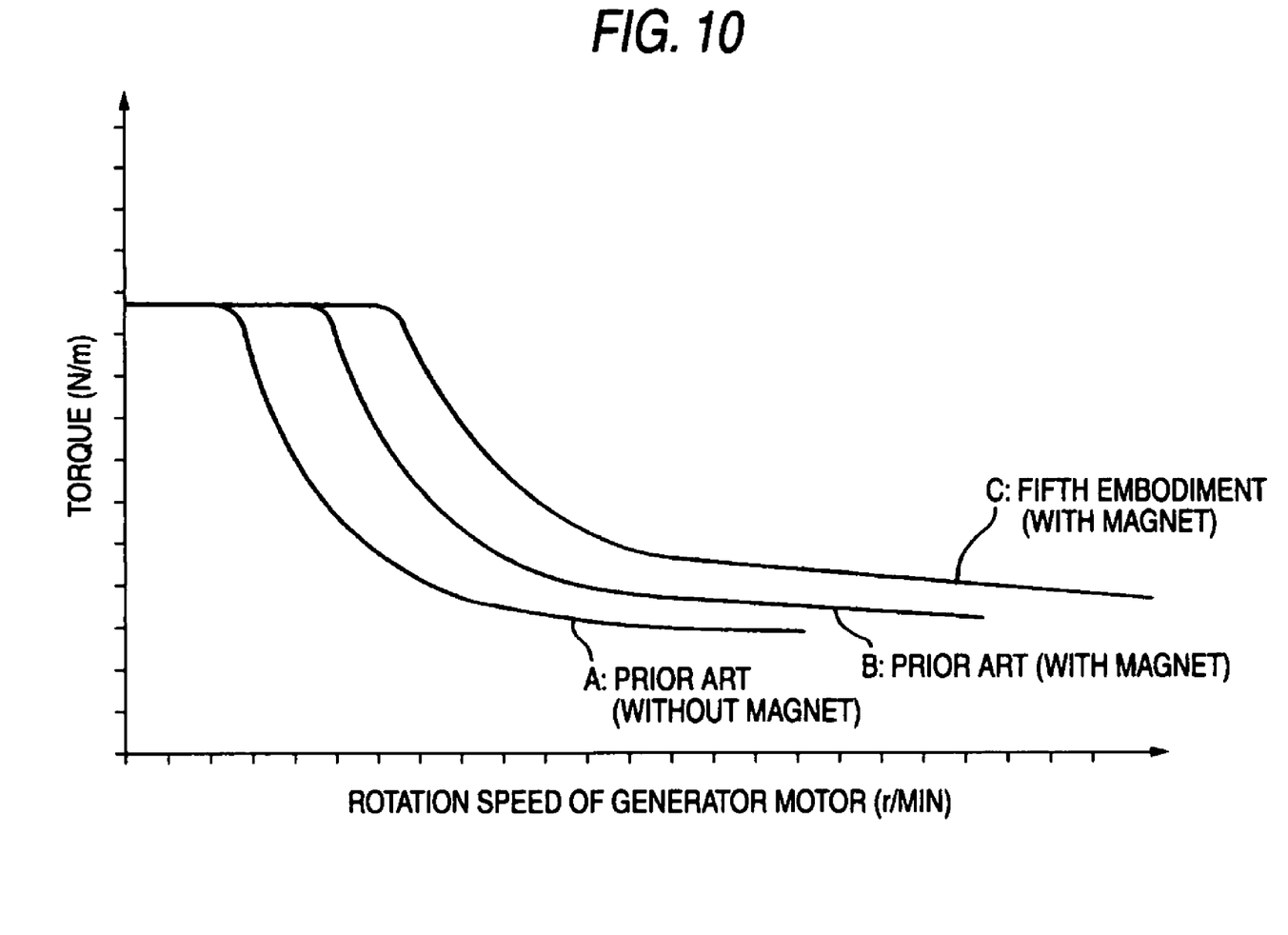
FIG. 10 illustrates torque characteristics of the rotating electrical machine according to the fifth embodiment of the invention and a rotating electrical machine in related art.

FIG. 10 illustrates torque characteristics of the rotating electrical machine according to the fifth embodiment of the invention and a rotating electrical machine in related art. In Figure, a horizontal axis denotes a rotation speed [r/min] of the charging generator and a vertical axis denotes output torque [Nm]. In addition, a curve A denotes a related art apparatus without a permanent magnet, a curve B denotes a related art apparatus with a permanent magnet, and a curve C denotes the fifth embodiment of the invention. In these rotating electrical machines, the specifications of armature windings are adjusted such that base torque (highest torque at the time of a row rotation) becomes equal.

As can be seen from the curve C according to the fifth embodiment of the invention shown in FIG. 10, a large torque is obtained at the same rotation speed and the torque can be generated up to high-speed rotation.

As mentioned above, according to the rotating electrical machine according to the fifth embodiment of the invention, weak field for preventing the over-voltage from being generated at the time of the high-speed rotation need not be performed and thus an allowable current capacity of the inverter can be reduced. Thus, a function for assisting the torque of the engine immediately after starting up the engine to smoothly drive a vehicle or a function for improving an acceleration response as well as a function for starting up the engine may be added.

Sixth Embodiment

Figure 11:
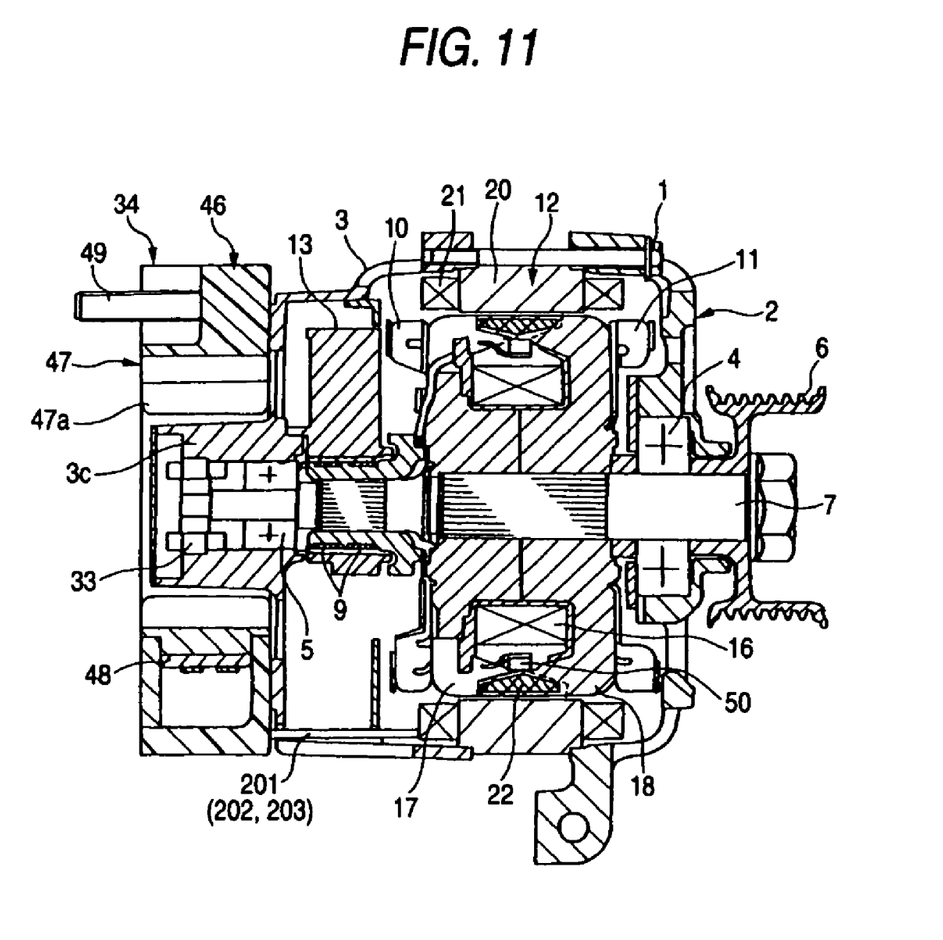
FIG. 11 is a longitudinal cross-sectional view illustrating a configuration of a rotating electrical machine including a charging generator and a starter generator according to a sixth embodiment of the invention.

FIG. 11 is a cross-sectional view illustrating a configuration of a rotating electrical machine including a charging generator and a starter generator according to a sixth embodiment of the invention. In FIG. 11, the rotating electrical machine including the charging generator and the starter generator is different from the charging generator according to the first embodiment in that a rotation position detector 33 for detecting the rotation position of a rotor 8 and an inverter unit 34 integrally mounted in the end surface of a bracket 3 are included as special components.

In FIG. 11, the inverter unit 34 includes a case 46 made of insulating resin and a heat sink 47 integrally formed in the case 46. The heat sink 47 is formed in a C-shape using good heat-conduction metal such as copper or aluminum, and fins 47a, which extend in an axis direction, are arranged on the inner wall surface of the heat sink 47 in a conformal pitch in a circumferential direction. A circuit board 48 is arranged on the heat sink 47 in an insulating state to be received in the case 46. On a circuit board 48, the switching elements 30, the diodes 29, and a capacitor 35 configuring the circuit shown in FIG. 9 are mounted.

The inverter unit 34 having the above-mentioned configuration is directly attached to the end surface of the bracket 3 such that the heat sink 47 surrounds a bearing box 3c of the bracket 3. Three-phase lines 201, 202, and 203, which extend from the ends of the Y-connection of an armature winding 21, extend from the bracket 3 to be electrically connected to the inverter unit 34. In addition, a battery (not shown) is electrically connected to a power supply terminal 49 of the inverter unit 34 through a direct current wire (not shown).

An operation of the rotating electrical machine according to the sixth embodiment of the invention having the above-mentioned configuration is the same as that of the fifth embodiment and thus their description will be omitted.

As mentioned above, according to the rotating electrical machine of the sixth embodiment of the invention, in addition to the effects of the fifth embodiment, weak field for preventing the over-voltage from being generated at the time of the light-load and high-speed rotation need not be performed. Thus, an allowable current capacity of the inverter can be reduced, the inverter unit can be compactly mounted and connected, and thus miniaturization and cost reduction can be realized.

What is claimed is:

1. A rotating electrical machine comprising:
   an armature core on which an armature winding is wound;
   a rotor core which is supported by a rotation axis at a predetermined air gap in an inner diameter side of the armature core, and includes claw-shaped magnetic pole portions, in which adjacent magnetic poles have different polarities, and a cylindrical portion having a field winding; and
   a permanent magnet which is provided in a magnetic circuit of the rotor core and which, together with the field winding, supplies magnetic flux to the armature core,
   wherein the rotor core is provided with a magnetic short-circuiting mechanism for reducing the magnetic flux, supplied by the permanent magnet to the armature core, by creating a short-circuit, between the magnetic pole portions of the rotor core, by deforming a portion of the magnetic short-circuiting mechanism by a centrifugal force.

2. The rotating electrical machine according to claim 1, wherein, the magnetic short-circuiting mechanism is made of a magnetic body, a fixing portion attached to one magnetic pole portion of the rotor core and an elastic deformation portion which extends from the fixing portion to the facing surface of the adjacent other magnetic pole portion through a connecting portion and short-circuits between the both magnetic pole portions in a high-speed rotation area configure a magnetic short-circuiting body unit, and a plurality of magnetic short-circuiting body units is formed in a ring shape in succession.

3. The rotating electrical machine according to claim 1, wherein, the magnetic short-circuiting mechanism is made of a magnetic body, a fixing portion attached to one magnetic pole portion of the rotor core and an elastic deformation portion which extends from the fixing portion to the facing surfaces of the adjacent other magnetic pole portions through connecting portions in the both sides and short-circuits between the both magnetic pole portions by at least a predetermined rotation speed configure a magnetic short-circuiting body unit, and a plurality of magnetic short-circuiting bodies is sequentially formed in succession.

4. The rotating electrical machine according to claim 1, wherein, in the magnetic short-circuiting mechanism, a connecting portion and elastic deformation portions which extend to the facing surfaces of adjacent magnetic pole portions in the both sides of the connecting portions and short-circuit between the both magnetic pole portions by at least a predetermined rotation speed configure a magnetic short-circuiting body unit, a plurality of magnetic short-circuiting body units is connected to a ring-shaped non-magnetic ring made of a non-magnetic material, and the non-magnetic ring is engaged to the magnetic pole portions.

5. The rotating electrical machine according to claim 1, wherein, in the magnetic short-circuiting mechanism, a fixing portion attached to one magnetic pole portion of the rotor core and an elastic deformation portion which extends from the fixing portion to the facing surface of one of the adjacent magnetic pole portions and short-circuits between the both magnetic pole portions by at least a predetermined rotation speed configure a magnetic short-circuiting body unit, and a plurality of magnetic short-circuiting body units is sequentially formed in succession.

6. The rotating electrical machine according to claim 2, wherein the elastic deformation portion faces the inner circumferential surface of the magnetic pole portion at a predetermined interval, comes into contact with the inner circumferential surface of the opposite magnetic pole portion by acceleration having at least a predetermined rotation number of the rotor core, and goes away from the inner circumferential surface of the opposite magnetic pole portion by deceleration having a rotation number equal to or smaller than the predetermined rotation number of the rotor core.

7. The rotating electrical machine according to claim 3, wherein the elastic deformation portion faces the inner circumferential surface of the magnetic pole portion at a predetermined interval, comes into contact with the inner circumferential surface of the opposite magnetic pole portion by acceleration having at least a predetermined rotation number of the rotor core, and goes away from the inner circumferential surface of the opposite magnetic pole portion by deceleration having a rotation number equal to or smaller than the predetermined rotation number of the rotor core.

8. The rotating electrical machine according to claim 4, wherein the elastic deformation portion faces the inner circumferential surface of the magnetic pole portion at a predetermined interval, comes into contact with the inner circumferential surface of the opposite magnetic pole portion by acceleration having at least a predetermined rotation number of the rotor core, and goes away from the inner circumferential surface of the opposite magnetic pole portion by deceleration having a rotation number equal to or smaller than the predetermined rotation number of the rotor core.

9. The rotating electrical machine according to claim 5, wherein the elastic deformation portion faces the inner circumferential surface of the magnetic pole portion at a predetermined interval, comes into contact with the inner circumferential surface of the opposite magnetic pole portion by acceleration having at least a predetermined rotation number of the rotor core, and goes away from the inner circumferential surface of the opposite magnetic pole portion by deceleration having a rotation number equal to or smaller than the predetermined rotation number of the rotor core.

10. The rotating electrical machine according to claim 1, wherein the magnetic short-circuiting mechanism is formed in a plate shape material containing both a magnetic material and an elastic material.

* * * * *